United States Patent [19]
Kung

[11] Patent Number: 5,769,605
[45] Date of Patent: Jun. 23, 1998

[54] SEALING DEVICE FOR A ROTARY SHAFT

[76] Inventor: Cheng Ching Kung, 12 Floor, No. 5, Alley 22, Lane 188, Kang-Shan Tung Rd., Kaohsiung, Taiwan, Taiwan

[21] Appl. No.: 495,318

[22] Filed: Jun. 27, 1995

[51] Int. Cl.⁶ .................................................. F04D 29/12
[52] U.S. Cl. ........................ 415/230; 277/82; 277/93 R; 277/94; 277/136
[58] Field of Search .......................... 415/230; 277/93 R, 277/94, 82, 96.1, 136

[56] References Cited

U.S. PATENT DOCUMENTS

| | | | |
|---|---|---|---|
| 1,998,611 | 4/1935 | Ford | 277/93 R |
| 2,028,360 | 1/1936 | Sprink | 277/93 R |
| 2,233,624 | 3/1941 | Magnesen | 277/93 R |
| 2,395,107 | 2/1946 | Dodge | 277/93 R |
| 2,464,989 | 3/1949 | Payne | 277/93 R |
| 3,093,381 | 6/1963 | Schulz | 277/93 R |
| 5,199,172 | 4/1993 | Runowski | 277/96.1 |

FOREIGN PATENT DOCUMENTS

| | | | |
|---|---|---|---|
| 716.339 | 8/1965 | Canada | 277/93 R |
| 596205 | 12/1947 | United Kingdom | 277/93 R |

Primary Examiner—Christopher Verdier
Attorney, Agent, or Firm—Morton J. Rosenberg; David I. Klein; Jun Y. Lee

[57] ABSTRACT

A sealing device for a centrifugal pump is mounted on an axle of the centrifugal pump and includes a retainer ring, a supporting ring, a rotor ring, and a fixing ring. The supporting ring includes a plurality of tongues extending outwardly and radially therefrom and each having a screw hole for engagement with the retainer ring. The rotor ring includes a plurality of notches each for engaging with an associated tongue, thereby mounting the rotor ring to the retainer ring.

1 Claim, 5 Drawing Sheets

SEALING DEVICE FOR A ROTARY SHAFT

BACKGROUND OF THE INVENTION

1. Field of the Invention

The present invention relates to an improved sealing device for centrifugal pumps.

2. Description of Related Art

A centrifugal pump generates pressure resulting from centrifugal forces by means of high speed rotation of blades thereof, thereby pumping fluid to a tower or reservoir at a higher place. In order to create the aforementioned pressure for pumping fluid, the pump casing must be in a well sealed condition. Therefore, a sealing device is required between the pump casing and the axle of the pump.

FIGS. 1 and 2 of the drawings illustrate a typical Japan-made sealing device for centrifugal pumps which includes a retainer ring 70, a supporting ring 71, a rotor ring 72, and a fixing ring 73. The retainer ring 70 includes a plurality of fixing holes 701 and spring holes 702 which extend in a direction parallel to the extending direction of an axle 1 of a centrifugal pump. The retainer ring 70 further includes a plurality of radial screw holes 703 through which screws 704 are inserted to securely fix the retainer ring 70 around the axle 1.

The supporting ring 71 is also mounted around the axle 1 and includes a flange 715 and an annular ledge 716 in which a plurality of threaded holes 712 are defined. Bolts 713 are extended through holes 712 and 701, and a plurality of springs 714 extend between the retainer ring 70 and the supporting ring 71 and each of which is partially received in an associated spring hole 702 of the retainer ring 70 such that the supporting ring 71 may move axially. A pair of ears 711 extend axially from a peripheral edge of the supporting ring 71 for engaging with corresponding notches 721 defined in the rotor ring 72 such that rings 70, 71, and 72 are co-rotatable with the axle 1. The fixing ring 73 is fixedly mounted to the pump casing 2 by means of notches 731 defined therein. A first O-ring 722 is mounted inside the rotor ring 72 while a second O-ring 732 is mounted around the fixing ring 73.

The springs 714 absorb shocks and vibrations during operation of the pump, and the retainer ring 70 allows the springs 714 to be uniformly allocated. The supporting ring 71 and O-ring 722 provide a reliable sealing effect between the rotor ring 72 and the axle 1, while O-ring 732 provides a reliable sealing effect between the fixing ring 73 and the casing 2. The rotor ring 72 and the fixing ring 73 are made of abrasive-resistant material and the contact surface therebetween is machined to a highly smooth surface so as to have a good closeness therebetween. As to the supporting ring 71 and the rotor ring 72, the ears 711 and the notches 721 together provide a loose fit therebetween such that the contact surface therebetween allows slight axial sliding movements, thereby further providing the rotor ring 72 and the fixing ring 73 with a good closeness.

The above-mentioned sealing device, however, is still found to have the following disadvantages:

(1) the ears 711 on the supporting ring 71 must be processed by means of milling which is very inconvenient, time-consuming, and expensive in cost; and (2) the ears 711 are thinned in their thicknesses and thus tend to deform and crack during operation of the pump, resulting in vibrations as well as leakage of the fluid.

FIG. 3 of the drawings illustrates a U.S. made supporting ring 80 and rotor ring 81 arrangement in which the supporting ring 80 includes a flange 801 and radial holes 802 through which pins 803 are inserted to mate with notches 811 defined in the rotor ring 81. However, after long-term use, the pins 803 tend to deform and sometimes even break.

Therefore, there has been a long and unfulfilled need for an improved sealing device to reduce the cost and to eliminate the disadvantages of the prior art sealing devices.

SUMMARY OF THE INVENTION

A sealing device for a centrifugal pump is mounted on an axle of the centrifugal pump and includes a retainer ring, a supporting ring, a rotor ring, and a fixing ring. The present invention features that the supporting ring includes a plurality of tongues extending outwardly and radially therefrom and each having a screw hole for engagement with the retainer ring. The present invention further features that the rotor ring includes a plurality of notches each for engaging with an associated tongue, thereby mounting the rotor ring to the retainer ring.

Other objects, advantages, and novel features of the invention will become more apparent from the following detailed description when taken in conjunction with the accompanying drawings.

DESCRIPTION OF THE PREFERRED EMBODIMENTS

Figure 1:
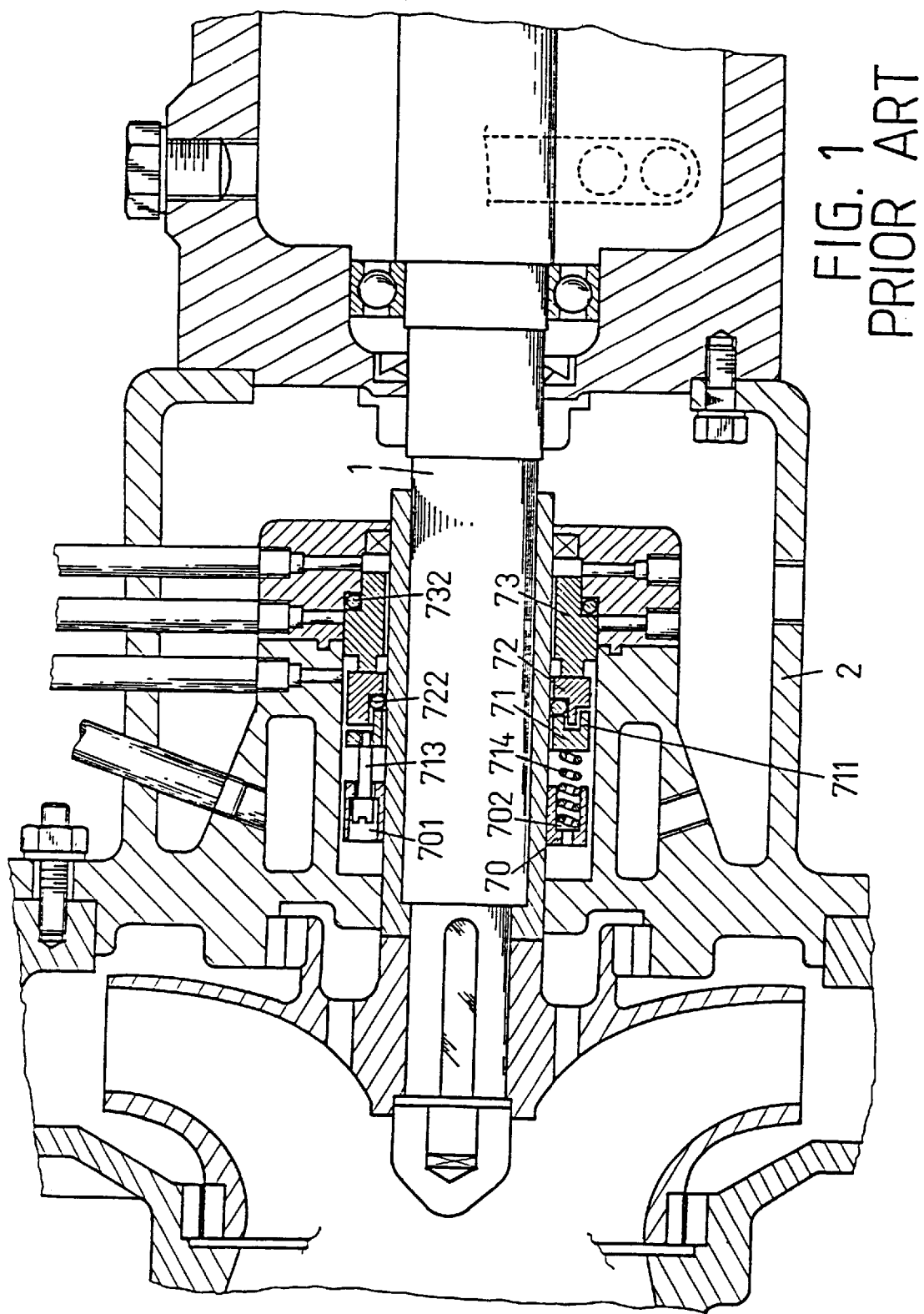
FIG. 1 is a cross-sectional view of a centrifugal pump with a prior art sealing device.
Figure 2:
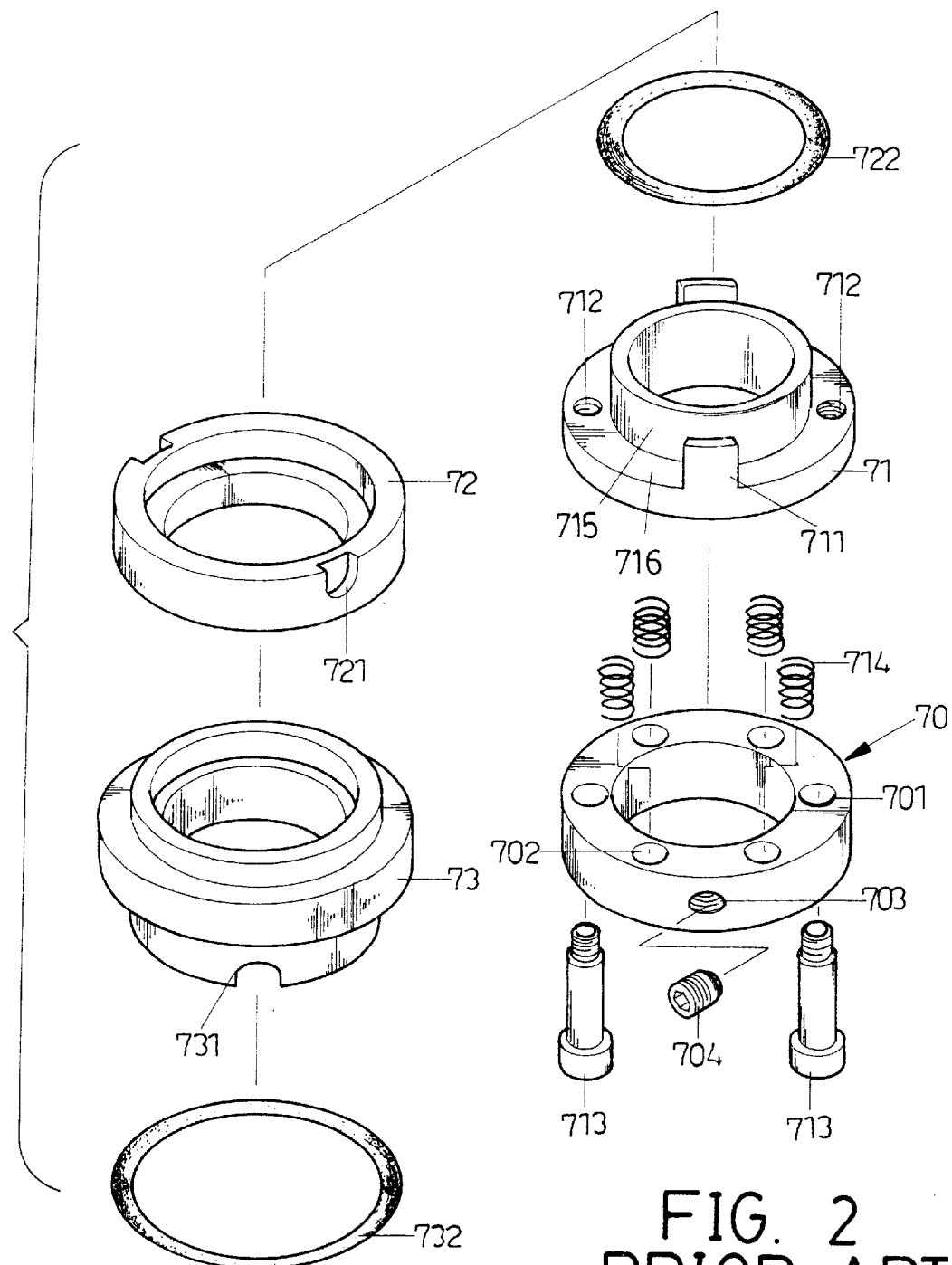
FIG. 2 is an exploded view of the prior art sealing device in FIG. 1.
Figure 3:
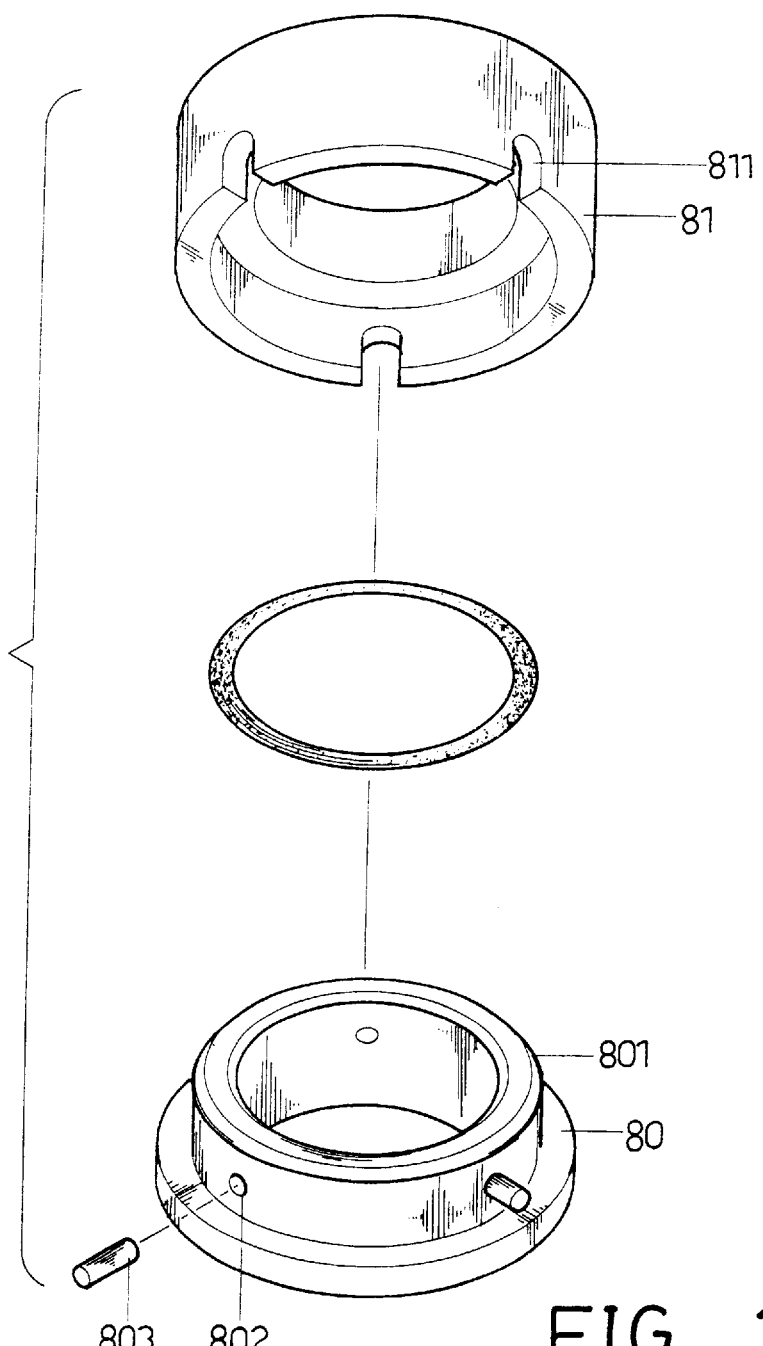
FIG. 3 is an exploded view of another prior art sealing device.
Figure 4:
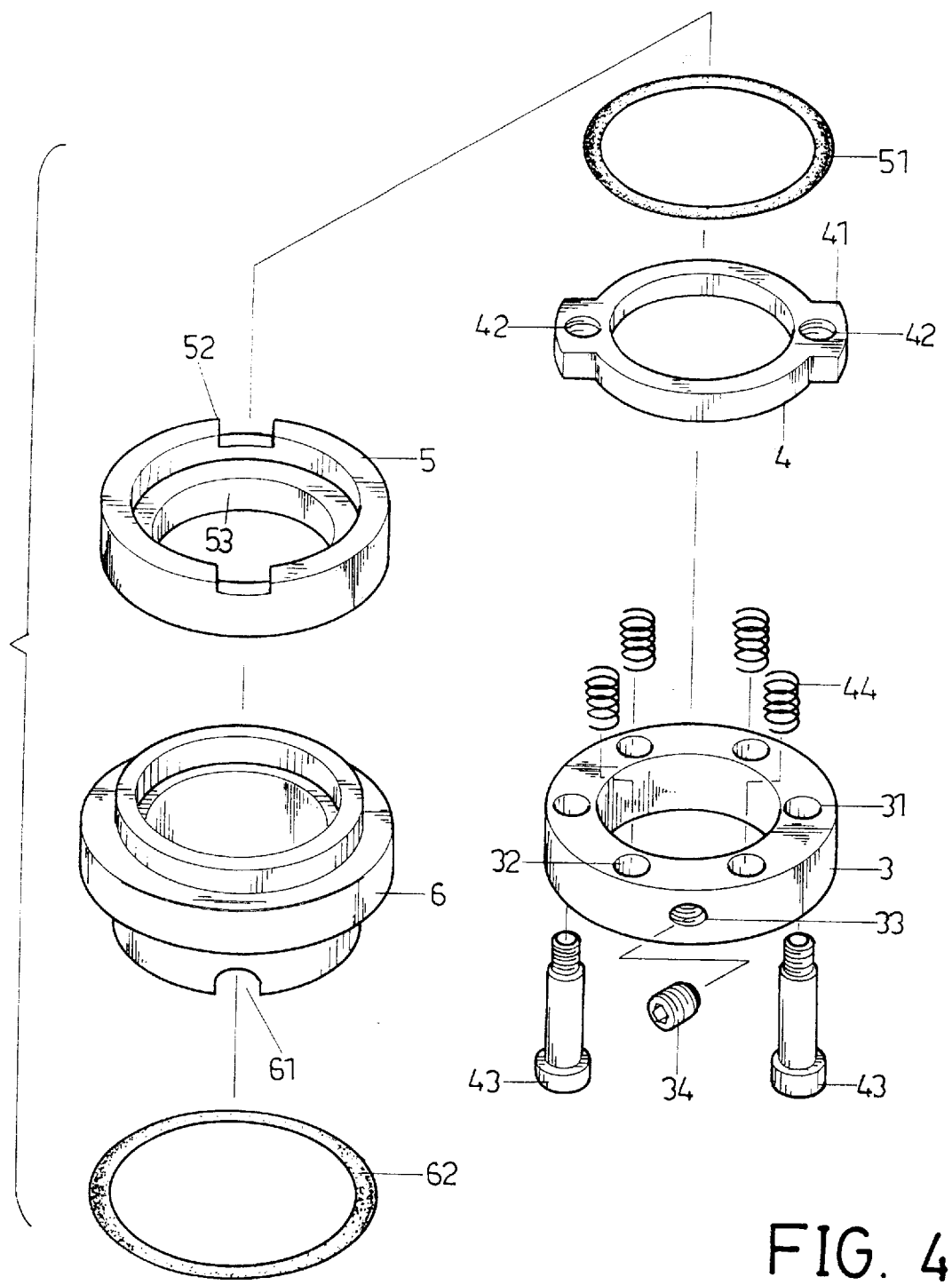
FIG. 4 is an exploded view of a sealing device in accordance with the present invention.
Figure 5:
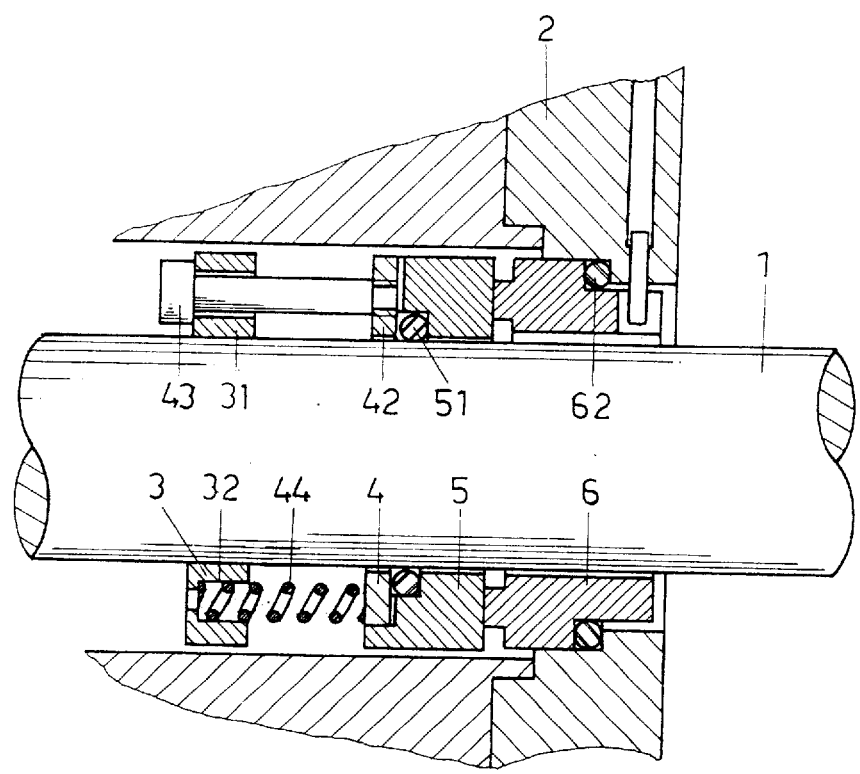
FIG. 5 is a schematic partial cross-sectional view of a centrifugal pump with a sealing device in accordance with the present invention.

Referring now to FIGS. 4 and 5 of the drawings and initially to FIG. 4, a sealing device in accordance with the present invention is mounted around an axle 1 (see FIG. 5) of a centrifugal pump and generally includes a retainer ring 3, a supporting ring 4, a rotor ring 5, and a fixing ring 6. The retainer ring 3 includes a plurality of fixing holes 31 (two holes 31 in this embodiment) and spring holes 32 which extend in a direction parallel to the extending direction of the axle 1. The retainer ring 3 further includes a plurality of radial screw holes 33 through which screws 34 are inserted to securely fix the retainer ring 3 around the axle 1. Structures of the retainer ring 3 and fixing ring 6 are respectively identical to those of the prior art retainer ring 70 and fixing ring 73 and therefore further description is not required. The present invention is characterized in the features of the supporting ring 4 and the rotor ring 5.

The rotor ring 5 includes an annular ledge 53 extending along an inner periphery thereof for mounting an O-ring 51 thereon to avoid leakage and a plurality of notches 52 defined in one side thereof. The supporting ring 4 is also mounted around the axle 1 and includes a plurality of tongues 41 (two tongues 41 in this embodiment) extending radially and outwardly therefrom for engaging with the notches 51 to securely position the 0-ring 51, each tongue 41 having a screw hole 42 defined therein.

Referring to FIGS. 4 and 5, screws 34 are extended through holes 33 to securely fix the retainer ring 3 onto the axle 1, and springs 44 extend between the retainer ring 3 and the supporting ring 4 and each of which is partially received in an associated spring hole 32 of the retainer ring 3. Bolts 43 are extended through the non-threaded holes 31 and are threadedly engaged within threaded holes 42 to securely fix the retainer ring 3 and the supporting ring 4 together. The rotor ring 5 has a loose fit with the supporting ring 4 by means of the notches 52 slidingly engaging with the tongues 41 mounted therein such that the axle 1, the retainer ring 3, the supporting ring 4, and the rotor ring 5 together rotate, i.e., torque from the axle 1 is transmitted to the rotor ring 5 via the retainer ring 3 (by means of the screws 34) and the supporting ring 4 (by means of bolts 43 and engagement between the notches 52 and the tongues 41). Elasticity of the springs 44 between the retainer ring 3 and the supporting ring 4 may absorb shocks and vibrations which are generated under rotation of the pump. The fixing ring 6 is mounted to an inner periphery of a pump casing 2 by means of notches 61 thereof, and an O-ring 62 is mounted around an annular ledge thereof.

According to the above description, the present invention provides the following advantages:

(1) the tongues 41 are integral with the supporting ring 4 to reinforce the structure, lengthen the life of the sealing device, and to allow easy assembly;

(2) the ears of the conventional supporting ring are formed by milling, while the supporting ring 4 of the present invention can be formed by punching to reduce processing steps and material, lower the cost, and to improve the length of life;

(3) the ears of the conventional supporting ring are perpendicular to the supporting rings such that the distance between the ears and the flange 715 of the supporting ring 71 is so small and thus causes inconvenient and troublesome processing procedures, while the present supporting ring has a simple structure that allows easy manufacture; and (4) the number of the tongues 41 of the supporting ring 4 and the notches 52 of the rotor ring 5 can be increased to reinforce the structure in response to the change of the pump lift, yet the cost thereof is not increased.

Although the invention has been explained in relation to its preferred embodiment, it is to be understood that many other possible modifications and variations can be made without departing from the spirit and scope of the invention as hereinafter claimed.

I claim:

1. A sealing device, said sealing device being mounted on an axle of a centrifugal pump, said sealing device including a retainer ring, a supporting ring, a rotor ring, and a fixing ring, the improvement comprising:

said supporting ring having a plurality of tongues extending outwardly and radially therefrom, each of said tongues having a threaded hole for threaded securement to an end threaded bolt member extending through a respective non-threaded through opening formed through said retainer ring for engagement of said supporting ring with said retainer ring, said retainer ring having a plurality of blind holes for insertion of a plurality of spring members bearing against said supporting ring and said retainer ring, on opposite sides thereof, and said rotor ring comprising a plurality of notches each for engaging with an associated one of said tongues, thereby mounting said rotor ring to said retainer ring.

\* \* \* \* \*